July 31, 1962 — H. L. STASSE — 3,047,447
METHOD FOR BONDING GYPSUM TO PAPER
Filed Nov. 25, 1957
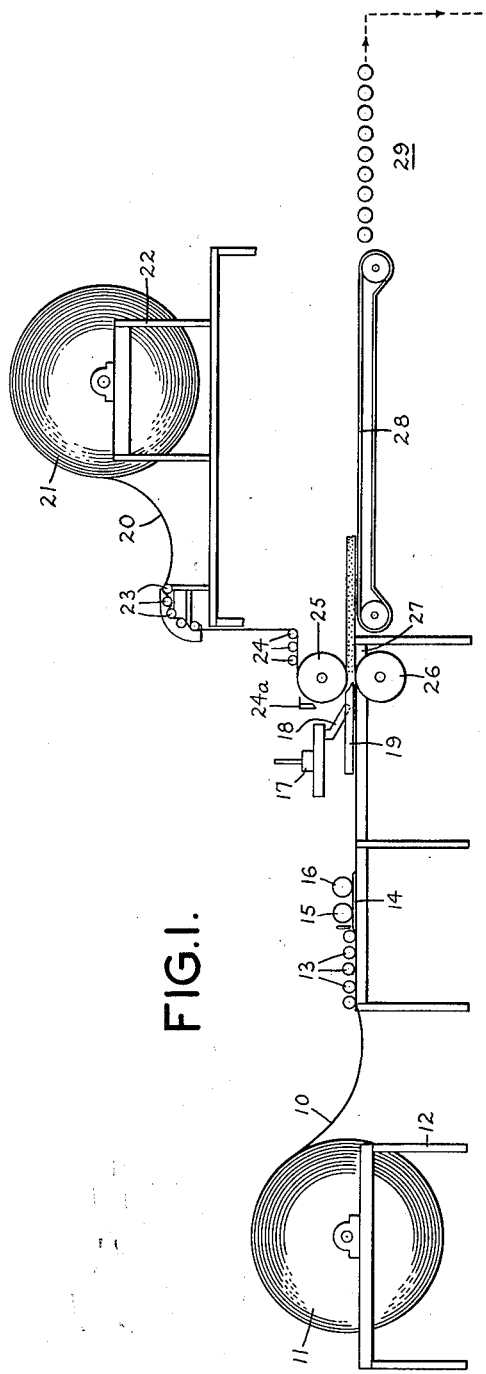
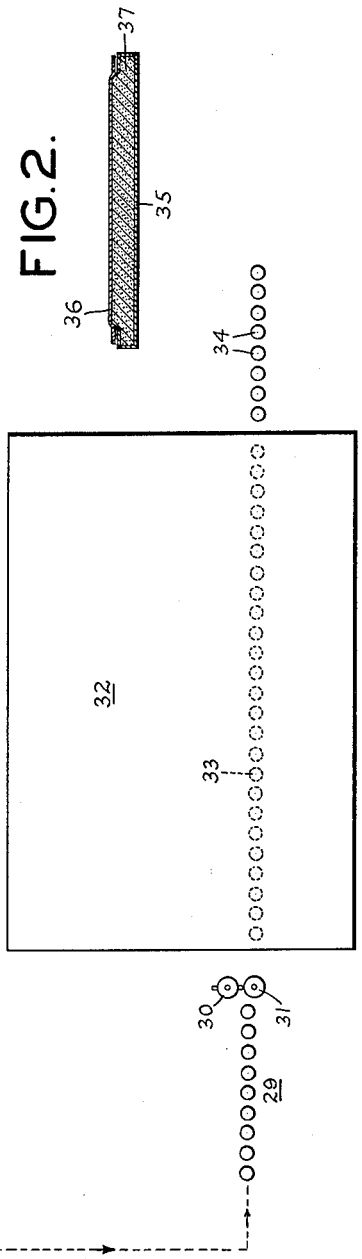
INVENTOR
HENRY L. STASSE
BY
Roger J. Drew
ATTORNEY

3,047,447
METHOD FOR BONDING GYPSUM TO PAPER
Henry L. Stasse, Hawthorne, N.J., assignor to Allied
Chemical Corporation, a corporation of New York
Filed Nov. 25, 1957, Ser. No. 698,703
6 Claims. (Cl. 156—40)

This invention relates to bonding gypsum to paper, and to products obtained thereby.

As a by-product of the known wet process for production of phosphoric acid by the action of sulfuric acid on phosphate rock, gypsum ($CaSO_4 \cdot 2H_2O$) is obtained containing residual phosphoric acid as an impurity. Details of the wet process are given in Kirk-Othmer's "Encyclopedia of Chemical Technology," vol. 6 (1951), pages 412–419 thereof. Analysis of a typical sample of air-dry, by-product gypsum obtained from this wet process shows the following composition: gypsum 98–99%, insoluble $P_2O_5$ 0.73%, phosphoric acid 0.38%, ferric oxide 0.03%, fluorine 0.40%, and silica 0.07%. When this by-product gypsum is calcined, water of crystallization can be partially removed therefrom to yield calcium sulfate hemihydrate ($CaSO_4 \cdot \frac{1}{2}H_2O$) or plaster of Paris. An important use of this hemihydrate, also known as stucco, is for manufacture of gypsum or plaster board.

In the manufacture of paper covered gypsum products such as gypsum or plaster board, a calcined gypsum-water slurry is placed between paper liners and the paper covered slurry is pressed to form a board of uniform thickness. The slurry is then permitted to set and thereafter the board is cut and dried. While it has been found that calcined gypsum derived from by-product gypsum containing residual acid such as phosphoric acid as an impurity adheres satisfactorily to paper liners of gypsum board, an undesirable yellowing of the liners due to residual acid has been observed. Furthermore the paper liners tend to deteriorate due to attack by the acid. Embrittlement of the liners may also result after a prolonged period with attendant cracking and breaking of the paper and, in addition, the acid may cause discoloration of the painted board surfaces. This deterioration and embrittlement of the paper liners is disadvantageous from a commercial standpoint.

Repeated washings have failed to remove acid present in by-product gypsum. Heretofore neutralizing agents such as lime, calcium carbonate, sodium carbonate, sodium bicarbonate and sodium hydroxide have been added to aqueous by-product gypsum slurries in varying concentrations, either before or after calcination, to neutralize the residual acid associated therewith. However adhering of the thus treated by-product gypsum to paper has been found to be highly erratic and generally unsatisfactory. Numerous procedures were investigated in an effort to improve this bonding or adhesion but no procedure could be established which would give consistent results. Other treatments such as washing, grinding before or after calcination, and addition of wetting agents, glues, and salts were also investigated. However, none of these procedures were successful when the above-mentioned neutralizing agents were used.

It is therefore an object of this invention to provide a method for bonding calcined gypsum derived from gypsum containing acid to paper, the products of which method exhibit improved performance over the prior art gypsum products having the disadvantages previously discussed. Another object is to provide gypsum or plaster board wherein the core adheres to the paper liners by means of a strong and uniform bond and wherein the paper liners are free of undesirable yellowing. A further object is to provide gypsum or plaster board having paper liners which will not deteriorate prematurely, which will not be substantially embrittled after prolonged periods, and which can be painted without subsequent discoloration of the painted surfaces.

In accordance with the invention, it has been found that improved bonding of gypsum to paper is obtained by neutralizing the acid impurity in calcined gypsum containing the same by treating the gypsum with ammonia, and applying a settable slurry of the neutralized gypsum and water to paper. Gypsum or plaster products, e.g. gypsum or plaster board, are obtained thereby which are considerable improvements over the prior art products previously mentioned by virtue of not having the aforementioned disadvantages of these prior art products.

Although not necessary to successful practice of the invention, it is preferred to neutralize the acid associated with the gypsum with ammonia prior to calcination and then immediately prior to use, such as in formation of the board, to add a sufficient amount of ammonia to the calcined gypsum to neutralize residual acid. Ammonia neutralization before and after calcination insures development to maximum extent of the bonding qualities of the set material to paper. These qualities are, however, usually developed to satisfactory extent when ammonia neutralization is effected only of the calcined gypsum, preferably during formation of the settable slurry used for making the product desired.

While it is advantageous to neutralize acid associated with the calcined by-product gypsum in the presence of relatively large amounts of water sufficient to slurry the gypsum, it is not necessary to successful practice of the invention to have such large amounts of water present during neutralization. Ammonia neutralization can be effected with satisfactory results in the presence of relatively small amounts of water insufficient to form a slurry.

Although the ammonia neutralized calcined gypsum is particularly well adapted for bonding to paper liners to prepare gypsum or plaster board or lath, it can also be used for other purposes or products wherein improved bonding of gypsum to paper is desired. For example, it can be utilized with good results as first or brown-coat plaster on gypsum lath.

Preferably, in preparing the settable slurry of water and calcined gypsum discussed above, the calcined by-product gypsum containing free acid is slurried with water in a gypsum-water weight ratio of from 100:45 to 100:80, preferably from 100:50 to 100:65 respectively. Ammonia, either in anhydrous or aqueous form, is then incorporated into the slurry in amount sufficient to bring the pH thereof to between 6 and 10, preferably between 7 and 8.5, and to neutralize the free acid therein. If desired, the ammonia can be incorporated into the water for forming the slurry, prior to forming the same, to effect neutralization as aforesaid. The thus treated slurry can then be bonded to paper to form the desired products.

In the preferred practice of the invention, by-product gypsum is slurried in water in a gypsum-water weight ratio of from 100:50 to 100:600 preferably from 100:200 to 100:400 respectively. The by-product gypsum contains acid both in free form capable of being readily neutralized and in occluded form (or trapped within the crystal structure of the gypsum) not readily neutralized prior to calcination. Sufficient ammonia, either anhydrous or aqueous, is added to the slurry to bring the pH thereof to between 8 and 10, preferably about 9. The treated slurry is allowed to stand for a short period, e.g. 10 minutes, and is then de-watered in conventional manner such as by filtering, centrifuging or evaporating. The gypsum cake is then calcined at temperature between 250° F. and 400° F., preferably between 300° F. and 350° F., whereby calcium sulfate hemihydrate is formed and occluded acid is liberated. Thereafter the hemihydrate is pulverized to dust or powder form, typically of a particle size 65% of which will pass a 325 mesh sieve with the finest particles having diameters typically between 1 and 10 microns. The pulverized calcium sulfate hemihydrate is then slurried with water in a hemihydrate-water weight ratio of from 100:45 to 100:80, preferably from 100:50 to 100:65 respectively. At the same time, ammonia, either anhydrous or aqueous, is incorporated into the slurry in amount sufficient to bring the pH thereof to between 6 and 10, preferably between 7 and 8.5, and to neutralize liberated acid impurities present therein. The thus produced calcium sulfate hemihydrate slurry can then be bonded to paper to form the desired product.

The usual components of gypsum or plaster board such as fillers, accelerators, foaming agents and the like may be added to the calcined gypsum slurry prior to utilization thereof.

The amount of ammonia which is added to the by-product gypsum-water slurry, prior to and/or after calcining, will depend on the acid content of the by-product gypsum and the particular pH (within the previously set forth pH ranges) desired. By-product gypsum obtained from the sulfuric acid digestion of phosphate rock previously mentioned will typically contain about 0.5% by weight of residual acid prior to calcining. Incorporation of 0.1% of ammonia (based on the weight of the water-byproduct gypsum slurry) into a 100:300 weight ratio slurry of this uncalcined by-product gypsum and water will neutralize about 50% by weight of the free acid and bring the pH of the slurry to about 9.0. Further, addition of 0.2% by weight of ammonia to this water-byproduct gypsum slurry will suffice to neutralize about 55% of the free acid and bring the pH thereof to about 10.0. By-product gypsum (obtained as discussed above), which has been treated with ammonia as described prior to calcining, will typically contain about 0.3% by weight of free acid after calcining. Addition of 0.16% by weight (based on the weight of the water-calcined gypsum slurry) to a 100:50 weight ratio slurry of this calcined gypsum and water will neutralize about 90% of the acid and bring the pH thereof to about 6.5. Further, incorporation of 0.2% by weight of ammonia into this calcined gypsum slurry will neutralize about 95% by weight of free acid and bring the pH of the slurry to about 9.0. Additionally, a typical calcined by-product gypsum, obtained as previously discussed, which has not been treated with ammonia prior to calcining, will contain about 0.6% by weight of free acid. Addition of 0.3% of ammonia to a 100:50 weight ratio slurry of this calcined gypsum and water will neutralize about 75% by weight of the acid and bring the pH thereof to about 6.5. Addition of 0.4% of ammonia into this last mentioned slurry will neutralize about 80% by weight of the acid and bring the pH of the slurry to about 9.0.

Ammonia can be incorporated into the gypsum slurry either as liquid anhydrous or aqueous ammonia (i.e., as ammonium hydroxide) or as ammonia gas. When anhydrous ammonia is utilized, the incorporating is preferably effected as a gas.

The temperature of the settable slurry is preferably maintained or brought to between 100° F. and 130° F. prior to application to paper. Setting is greatly accelerated by employment of such temperature and rapid adhesion of slurry to paper is attained. This rapid adhesion is particularly important in production of gypsum board because improved adhesion of slurry to wet paper liners is thereby attained at the cutting knife (of the board forming machine). This improved adhesion at the cutting knife is attained even without addition of substantial amounts of potassium sulfate and at normal conveyor belt speed. Maintenance of slurry temperature at between the aforesaid temperature range can be effected by, for example, use of warm water in forming the slurry having temperature advantageously in the upper portion of this desired temperature range but not substantially in excess of the upper temperature limit, or use of water-soluble anhydrite in typical amount of about 60% by weight (based on combined weight of the calcined by-product gypsum and anhydrite) together with the calcined by-product gypsum in forming the settable slurry. Water having temperature between 60° F. and 100° F. is used for forming this last mentioned slurry, and the exothermic heat of reaction of the anhydrite with water raises the slurry temperature to within the temperature range previously mentioned.

Addition of a small amount, e.g. about 1%–10% by weight (based on weight of the calcined by-product gypsum) of calcined natural gypsum to the settable slurry of calcined by-product gypsum and water, prior to applying the slurry to paper, improves adhesion of the gypsum to the paper.

The following examples are illustrative of the invention and not restrictive. Parts and percentages are by weight unless otherwise specified.

*Example I*

One thousand (1,000) parts of gypsum cake obtained as a by-product from the wet process production of phosphoric acid by the action of sulfuric acid on phosphate rock and containing approximately 0.5% of residual phosphoric acid was slurried with 1,000 parts of water. 0.4% of ammonium hydroxide (of 29% concentration) based on the weight of the slurry was incorporated into the slurry at room temperature. The mass was filtered and the pH of the filtrate was 9.5. The filter cake was air dried and then calcined at 300° F. in a convection-type oven for 24 hours whereby occluded phosphoric acid was liberated. Thereafter the calcined material was micro-pulverized and the resulting powdered stucco was slurried with water in a weight ratio of 100:50 respectively. 0.5% of ammonium hydroxide (of 29% concentration) was added to this gypsum slurry to bring the pH thereof to about 8.0 Adhesion of this product to paper was found to be excellent with no yellowing or embrittling of the paper after 30 weeks.

A calcined gypsum slurry similar to that of Example I, which had 1% by weight of calcium carbonate incorporated therein both prior to and after calcining instead of ammonium hydroxide, showed unsatisfactory adhesion to paper.

*Example II*

One thousand (1,000) parts of gypsum cake obtained as in Example I containing approximately 0.5% of residual phosphoric acid was calcined at 300° F. in a convection-type oven for 24 hours. The calcined material was pulverized to powder form, and the powdered stucco was then slurried with water in a weight ratio of 100:50 respectively. Thereafter 0.8% of ammonium hydroxide (of 29% concentration) was added to this gypsum slurry to bring the pH thereof to about 8. Adhesion of this product to paper was excellent with no yellowing or substantial embrittling of the paper after 30 weeks.

Example III

A slurry or mix for production of ⅜″ gypsum board was compounded having formulation as follows:

| | Lbs. per thousand square feet of gypsum board |
|---|---|
| By-product stucco (obtained as in Example I) | 1050 |
| Natural stucco | 91 |
| Potassium sulfate | 13 |
| Starch | 12 |
| Cork | 25 |

Water volume to produce a mix consistency (penetration) between 20 and 30 mm.
Ammonia to produce pH in the mix between 7.5 and 8.5.
Potassium rosinate soap to produce a cup weight of 120±2 gm.

The temperature of the water was 100° to 110° F. and operating speed of the conventional board forming machine (hereinafter described) was normal. Approximately 75,000 square feet of gypsum board was made. Paper adhesion of this board was found to be excellent with no embrittling or yellowing of the paper after 30 weeks.

In foregoing Example III consistency of the slurry or mix was measured by quickly filling a 100 ml. cup level to the brim with mix, then immediately positioning the plunger of a modified Vicat apparatus (as described in A.S.T.M. standard test method C 26–56) without auxiliary weights perpendicular to the top surface of the mix in contact therewith, and immediately thereafter releasing the plunger. The depth of penetration into the mix was read in millimeters. Cup weight in Example III means the weight in grams of a 100-ml. paper cup filled level with the brim with mix.

For a more complete understanding of the instant invention as applied in the known method of preparing gypsum or plaster board, reference is made to the accompanying drawings wherein:

FIGURE 1 is a schematic view of conventional apparatus for preparing the improved gypsum board of this invention.

FIGURE 2 is a transverse sectional view through the improved gypsum or plaster board, the edge portions of the backing sheet of which (for purposes of clarity in showing detail) are detached from the edge portions of the facer sheet thereof.

Referring now to FIGURE 1, a first or facer sheet 10 of paper is continuously unwound from supply roll 11 mounted in rack 12 and passed through guide and tensioning rolls 13. Sheet 10 then passes over support 14 and under four scoring saws, two saws being mounted in spaced relation at each of the two marginal or edge portions of the sheet. Inner scoring saw 15 together with the inner scoring saw (not shown) at the opposite edge of the sheet cut inner score lines into the sheet edges which determine the final width of the board. Outer scoring saw 16 together with the outer scoring saw (not shown) at the opposite edge of the sheet cut outer score lines into the sheet edge, each outer score line being ⅜″ or ½″ from each inner score line depending on the product thickness desired.

Slurry or mix comprising ammonia-neutralized calcined by-product gypsum and water prepared in accordance with foregoing Example III is passed from the bottom of pin mixer 17 through nozzle 18 and deposited on the surface of sheet 10. Conventional folding bar 19 mounted at one edge of sheet 10, and a second folding bar (not shown) mounted at the opposite edge of the sheet, then move upwardly and partially over the deposited slurry on the sheet to fold sheet 10 at the score lines to partially enclose the deposited slurry. A second or backing paper sheet 20 is continuously unwound from supply roll 21 mounted in rack 22 and passed through guide and tensioning rolls 23. Thereafter the backing sheet is subjected to the action of buffing wheels 24 mounted over both marginal or edge portions thereof, which wheels buff and make thinner the edge portions of the backing sheet which are to be pasted to folded edges of facer sheet 10. Any suitable paste well known in the art for bonding paper is then applied through nozzle 24a to surfaces of the thinned edge portions of sheet 20 (while on forming roll 25), which will contact the folded edges of sheet 10 partially enclosing the slurry.

Backing sheet 20 and facer sheet 10 with deposited slurry or mix therebetween then pass between forming rolls 25 and 26 where backing sheet 20 is pressed onto the mix and into contact with the folded edge portions of facer sheet 10, and a board of substantially uniform thickness is formed. Formed board then passes over support 27 onto endless belt conveyor 28 and is continuously advanced thereby to roller conveyor 29. The board is advanced on conveyor 29 and, by the time it reaches cutting knives 30 and 31, its core mix has set sufficiently and adheres sufficiently well to the paper sheets to enable cutting of the board without disbonding into desired lengths. The board passes from the cutting knives into drying oven 32 and is advanced therethrough on roller conveyor 33. After drying, it is removed from the oven on roller conveyor 34 and, if desired, trimmed, and then loaded for storage or market.

With reference to FIGURE 2, paper facer sheet 35 and paper backing sheet 36 adhere to gypsum core 37 by a strong and uniform bond. Slurry or mix used for core 37 was prepared in accordance with foregoing Example III, the residual acid of the by-product gypsum having been neutralized to form the corresponding salt by treatment with ammonia as previously discussed. The paper of this board was free of yellow discoloration and showed neither deterioration nor embrittlement after thirty weeks. As shown, the edge portions of sheet 36 normally pasted to the folded edge portions of sheet 35 are detached therefrom to more clearly show where these sheets are pasted together.

What is claimed is:

1. In the method for preparing gypsum board comprising continuously advancing a first paper sheet, depositing a settable slurry of water and calcinated by-product gypsum upon said first sheet, folding the edges of said first sheet to partially enclose the slurry, continuously advancing a second paper sheet, applying paste to edge portions of the advancing second sheet which will contact folded edge portions of said first sheet, pressing the sheets and slurry therebetween to form a board of substantially uniform thickness, allowing the slurry of the formed board to set, and thereafter drying the board, the improvement which comprises utilizing as the aforesaid settable slurry a slurry of water and calcined by-product gypsum prepared by slurrying by-product gypsum containing residual free and occluded phosphoric acid as an impurity with water, incorporating ammonium hydroxide into the resulting slurry in amount sufficient to bring the pH thereof to between 8 and 10 and to neutralize the free phosphoric acid to form the ammonia neutralization salt of the phosphoric acid in the slurry, de-watering the thus-treated slurry to form a de-watered gypsum cake, calcining the de-watered cake whereby calcium sulfate hemihydrate is formed and occluded phosphoric acid is liberated, pulverizing the calcium sulfate hemihydrate to powder form, slurrying the calcium sulfate hemihydrate powder with water, and incorporating ammonium hydroxide into the slurry in amount sufficient to bring the pH thereof prior to setting to between 7 and 8.5 and to neutralize liberated phosphoric acid to form the ammonia neutralization salt of the liberated phosphoric acid in the slurry.

2. A process of forming a strong bond of by-product gypsum to paper which comprises calcining by-product gypsum containing residual phosphoric acid as an impurity, slurrying the calcined by-product gypsum with water, incorporating ammonia into the slurry prior to placing the slurry between paper liners to induce good bonding of the gypsum to paper, said ammonia being sufficient to bring the pH of the slurry prior to setting to between 6 and 10, applying a settable slurry of the ammonia treated gypsum and water between paper liners and allowing the slurry to set and form a strong bond of the gypsum to the paper liners.

3. The method of claim 2 wherein the ammonia is incorporated into the water for forming the settable slurry prior to forming the slurry.

4. The method of claim 3, wherein the pH of the slurry prior to setting is between 7 and 8.5.

5. The method of claim 2, further characterized by maintaining the temperature of the settable slurry prior to placing the slurry between the paper liners, at between 100° and 130° F., whereby rapid adhesion of the slurry to the liners is obtained.

6. The method of claim 2, further characterized by adding a small amount of calcined natural gypsum to the settable slurry of water and ammonia treated gypsum prior to placing the slurry between the paper liners, whereby improved adhesion of the gypsum to the liners is attained.

References Cited in the file of this patent

UNITED STATES PATENTS

| | | |
|---|---|---|
| 1,500,452 | Haggerty | July 8, 1924 |
| 1,548,358 | Edwards | Aug. 4, 1925 |
| 1,713,868 | Edwards | May 21, 1929 |
| 1,758,448 | Liljenroth | May 13, 1930 |
| 1,900,381 | Hansen | Mar. 7, 1933 |
| 1,907,438 | Ober et al. | May 9, 1933 |
| 1,932,956 | Crandell | Oct. 31, 1933 |
| 2,485,164 | Peirce | Oct. 18, 1949 |
| 2,700,605 | Hornibrook | Jan. 25, 1955 |